United States Patent [19]

Rentmeester

[11] 4,346,814

[45] Aug. 31, 1982

[54] SIDE SEAM STRIPES

[75] Inventor: Kenneth R. Rentmeester, Varrington, Ill.

[73] Assignee: American Can Company, Greenwich, Conn.

[21] Appl. No.: 126,190

[22] Filed: Mar. 3, 1980

[51] Int. Cl.$^3$ .................... B65D 7/34; B29D 23/10; B65D 1/16

[52] U.S. Cl. .................... 220/75; 156/218; 156/291; 428/35; 428/463

[58] Field of Search .................... 428/35, 36, 57, 128, 428/129, 463, 219, 331, 341, 157; 156/218, 291; 220/75, 76, 79, 80; 113/120 F, 120 K, 120 R; 260/32, 8 R; 138/151, 152, 156, 157, 158, 170

[56] References Cited

U.S. PATENT DOCUMENTS

| | | | |
|---|---|---|---|
| 2,163,619 | 6/1939 | Murch | 220/75 R |
| 3,066,063 | 11/1962 | Ecklund et al. | 156/218 |
| 3,816,206 | 6/1974 | Coster | 156/218 |
| 3,819,085 | 6/1974 | Rohowetz | 156/218 |
| 4,033,474 | 7/1977 | Rentmeester | 220/75 R |
| 4,228,061 | 10/1980 | Plueddemann | 428/463 |
| 4,233,362 | 11/1980 | Novak | 428/463 |
| 4,234,711 | 11/1980 | Emmons et al. | 428/463 |

OTHER PUBLICATIONS

W. S. Penn, "PVC Technology", Pub. by Maclaren & Sons, Ltd., (1966), pp. 370–380.

*Primary Examiner*—William J. Van Balen
*Attorney, Agent, or Firm*—Stuart S. Bowie; Paul R. Audet; Aaron Passman

[57] ABSTRACT

A material for protecting the inside surface of a side seamed cylindrical container is disclosed. The material is of a thixotropic nature whereby edge protection is assured for a lap seam, a can seam or a welded seam, the latter being either a lap or butt-type joint. All of the foregoing constructions exhibit certain internal surface irregularities exposing raw metal to the interior of the container which must be appropriately covered in order to maintain sanitary protection of the contents ultimately packed within the container. Thixotropic materials have been found to provide the requisite surface adherence after application and until curing; thus, affording improved coverage of the various raw surfaces.

7 Claims, No Drawings

SIDE SEAM STRIPES

BACKGROUND OF THE INVENTION

The background of this invention relates to the packing and processing of comestibles such as food and beverage in containers having a seam along one interior side surface. In particular, such containers are usually coated 3-piece cans in that they are constructed from a cylindrical hollow open ended body and two circular ends. Three-piece containers are fashioned from flat blanks of metal sheet stock which are rolled into a cylindrical form and along a longitudinal side are sealed by soldering, by bonding, by cementing or by welding. Such flat strips of metal are heavily treated to resist corrosion by application of tin, chromium and/or organic coatings. Such treatments protect substantially the entire inside and outside surfaces of the 3-piece container body. The formed cylindrical body has two open ends which are completed by circular bottom and top closures and which are also precoated and/or plated.

During the formation of such a container, the side seaming operation is such that a raw edge or raw metal is exposed to the inside of the container. Such a raw or untreated surface must be protected by a post forming coating operating in order to assure proper conditions for the ultimately packed and processed comestibles. In the past, raw inside surfaces of a container were covered by materials such as solution vinyl stripe coatings which tend to run off sharp raw edges, sag and drip. Consequently, high coating weights or multiple layers of coating were required in order to provide adequate coverage. The heavier coating required longer and/or higher curing times and temperatures in order to remove the solvents. Sometimes total removal of solvents was practically impossible resulting in internal contamination of the packed and processed comestibles giving an off-flavor to the product. While the surface finish of the seam is a function of the manufacturing process used to generate it; such seams need internal protective covering over any exposed raw metal.

In order to overcome the problems with the prior solution stripes, it is an object of the present invention to provide a material which upon application forms a gel structure which adheres across the rough internal surface presented by a manufactured seam.

It is a further object of the present invention to minimize the coating weight and thickness of such repair seams.

It is a still further object of the present invention to provide an internal surface repair coating which requires a minimum amount of energy for purposes of curing.

It is a final object of the invention to provide a low cost, reliable and effective internal raw surface protection coating for a 3-piece comestible container.

SUMMARY OF THE INVENTION

The present invention relates to thixotropic coatings which are liquid under the high shear forces of application and become a gel upon residence at the surface to be protected. Thixotropy is the ability of a material to reversibly become liquid under high shear and then return to a gel at rest. Such materials before curing can be converted from liquid to gel indefinitely. Cab-O-Sil and Bentone are thixotropic agents which when mixed with solution coatings change the properties whereby an amount of thixotropy becomes apparent and by varying the weight percentage of such agents to the coating the amount of thixotropy can be adjusted. Thickening agents have been added to epoxy phenolic and vinyl coatings in order to enhance their ability to adhere to rough raw inside surfaces of manufactured containers. An addition from 2 to 20% of thixotropy agents to resin solids will provide the desired characteristics and improve the adherence of the applied repair coating to the raw internal surfaces. Similarly, certain organosol material can be made thixotropic in nature without the addition of these particular thickening agents. Thixotropic organosols are formulated by appropriately balancing the types and amounts of solvents with specific regard to solvent polarity. Because these coatings are applied to containers and are cured by baking at temperatures in the range of 250° F. to 450° F. the thixotropy must be adequate to maintain the gelatinous adherent species at such temperature ranges for several minutes. For the most part this raw internal surface protection is applied over an area of one-half inch wide and about four inches long giving a total surface of two square inches. Consequently, the repair coating application weight over that internal surface area will be somewhere between 5 and 30 mg or preferably about 10 mg per two square inches which equals 5 mg per square inch. Nonthixotropic side seam solution stripes applied at the same rate would become runny and give inadequate internal corrosion protection.

DETAILED DESCRIPTION OF THE INVENTION

Even though the coating thickness applied in a repair stripe is extremely thin it has been found that the addition of a thixotropic agent functions to permit much thinner coatings to cover rough raw metal surfaces. There are various ways of testing container performance. The standard method is to pack and process comestibles and then store them for a period of time, checking the contents for spoilage and off-flavor at prescribed intervals. Such an approach is essential for safety and shelf-life recommendations and in order to evaluate a new inside repair coating. A simplified test procedure is referred to an Enamel Rater Readings in that it promptly evaluates whether a coating is continuous and adequate. More particularly, the striped container can be easily tested by filling it with an electrolyte and checking the electrical continuity or lack thereof between the outside of the container body and an electrode positioned in the center of the electrolyte filled container. Such a procedure is common in the can manufacturing industry and is recognized as a measure of the successful performance of an internal can coating.

In order to perform a quick test, equipment such as a Model 1071 WACO Enamel Rater is used. The apparatus has an electrode adapted to move vertically in and out along the central axis of a can located beneath it. The electrode is positioned 1" from the bottom of the can during testing and the can is held in a vise-like device which clamps it about the bottom, holding it so the open end of the can faces the electrode. The can is filled with 2% solution of sodium sulphate and allowed to soak for at least 30 seconds before the electrode is dropped into the can during testing. The solution temperature should be maintained between 72° to 78° F. and the can should be filled so that when the electrode is lowered into the test position the solution will reach approximately ⅛" below the top flange radius. Care should be taken to avoid wetting the flange since false readings will result. The milliamp meter of the tester is connected to the vise-like device which holds the bottom of the can and the electrode is connected to another lead of the milliamp meter. The instrument must be zeroed and the milliamp adjusted to read "T" on the scale. Shortly thereafter a warning light comes on and the reading should be taken immediately. This procedure was applied to containers striped with various thixotropic coatings and data indicative of successful repair stripes was found. Subsequent taste tests and analytical studies of containers packed with various comestibles and stored for prescribed time periods verified the efficacy of the repair stripes.

A thixotropic agent which has performed well in the preferred embodiment is Cab-O-Sil ®, the trademark product of the Cabot Corporation of Boston, Massachusetts, which product is 99.8% fumed silica having a specific gravity of 2.2, a color of white, a refractive index of 1.46 and an amorphous form. The particular grade is designated by Cabot Corporation as M-5. That M-5 grade has a surface area of 200± square meters per gram, a particle size of 0.012 Micron and a density maximum of 2.3 pounds per cubic foot. Such materials are also made by other companies and can be used successfully in combination with standard inside coating materials to impart thixotropic nature to the coating.

The Cab-o-Sil silica is used to introduce particles with extremely high surface area which act to absorb a certain amount of the coating material. More particularly, the silica acts to form a series of sites which encourage agglomeration to a flock thus promoting boundary layer influences on the coating material flow. That is to say, the coating material most closely associated with the silica will flow poorly relative to that which is farther away from the silica and the flocks act to move along shear planes under the stress of high shear. Consequently, the addition of silica to the coating material will form a dispersion with a gel structure which upon application of high shear force can become a liquid. The advantage of the gel structure in connection with solution coatings is that extremely thin layers of solution coating will not run even though heat is applied during curing. Such application of heat tends to thin the solution coating but not sufficiently when same is made thixotropic.

Vinyl organosols can be made thixotropic without the addition of silica or the like by means of the addition of a less active ketone such as di-isobutyl ketone. Di-isobutyl ketone tends to swell the dispersed polyvinylchloride particles giving them a gel structure which will act to permit the coating to adhere without running or sagging even under curing temperatures.

The surface after welding in a Soudronic welder is in a nature of a lap joint wherein the material at the weld line is primarily a very thin layer of copper, iron alloy. This results from the pressure brought to bear upon the lap joint by the current flow through the copper wires used in the welded process. The body metal in the preferred examples which follows was 0.0083" thick thus the lap edge is at least 0.0083" and normal to the inside surfaces. The thickness of the coating when applied at the rate of 5 mg per square inch is approximately 0.0003". Thus, an extremely thin layer of stripe material is available for protecting the surface irregularities of the exposed iron copper alloy and the edge formed by the end of the lap joint.

EXAMPLE 1

This example is a control stripe which is not thixotropic and was applied to the inside of a Soudronic seamed 211×400 container body. The stripe was approximately one-half inch wide and four inches long; the application rate was over 6 mg per square inch by air atomized spray. It was cured at 450° F. for 2½ seconds by means of radio frequency induction heating. The coating material was a Mobil Oil Company MC 642-C-46$^s$ which at application had a viscosity of 19 seconds obtained by a 35% volume reduction of a 70-30 xylene and diacetone-alcohol blend. Subsequently, the striped containers were quick tested and found to conduct 135 milliamps average current. While 135 milliamps is acceptable for packing some products it is not considered by the can industry as being a commercial quality stripe. Similarly, after processing the container with water for an hour at 250° F. a visual examination of adherence and blush resistance and a physical tape test with Scotch brand #910 tape showed that the control stripe without thixotropy performed poorly.

EXAMPLE 2

This example was a silica modified aluminum pigmented organosol dispersion with epoxy, phenolic and vinyl solution resins to which was added 6% of Cab-O-Sil M5 silica to resin solids. This coating was applied by the same method as, and at the same rate and cure of the coating in Example 1. The quick test gave a 21 milliamps average reading for the Cab-O-Sil modified coating and 72 milliamps average for the same coating without the silica.

EXAMPLE 3

The next coating material is thixotropic in nature and was specifically ordered for testing from Midland, a Division of Dexter Corporation under their coating code CR11-74. That coating is a clear gold vinyl dispersion modified with epoxy, polyester, melamine and vinyl solution resins. The partial solvation of PVC particles give this thixotropic coating. This particular coating has approximately twice the solids per unit volume of the coating heretofore presented by way of Example I. Because of its higher solids it can therefore be applied in a heavier single layer without fear of solvent retention in the cured coating. That is to say, that the percentage of solvent in this coating is less and, therefore, the solvent removal during curing is greater percentage wise. A stripe of approximately 2 square inches was applied to a Soudronic welded can 211×400 which was then cured for 2½ seconds at 450° F. by induction radio frequency heat. The coating weight was approximately 14 mg per square inch. Quick test results were 15 milliamps. When a double induction cure was used (i.e., another application of radio frequency energy for 2½ seconds at 450° F.), the quick test results were again 15 milliamps thus verifying the complete cure of the coating with one treatment of radio frequency energy.

While specific coating materials have been described and explained by way of example, the present invention in its broadest application and context includes any thixotropic coating which is applicable in connection with protection by means of covering and sealing raw surfaces remaining inside a container after it has been manufactured and before it is packed and processed. It is, therefore, desired that the claims which follow will be read to cover the invention with scope appropriate and commensurate to its overall contribution to the art.

What is claimed is:

1. A container having a hollow body formed from a flat sheet of metal and containing a seam along a side thereof wherein said seam has exposed raw metal facing inwardly, said container including a side seam stripe comprising a coating being thixotropic in nature and applied over the raw metal at a rate of about 5 mg per square inch to gel and thus adhere across the rough surface of the exposed raw metal sufficiently to substantially prevent any metal exposure after application and during curing at elevated temperatures.

2. The container of claim 1 wherein said side seam is a welded lap joint presenting a raw edge of metal inwardly into said container and portions of inward metal surface adjacent said joint which are rough and raw metal and said curing temperatures are in the range of 250° F. to 400° F.

3. The container of claim 2 wherein said metal stock is about 0.0083" thick and said lap joint has said edge which presents a substantially normal surface relative to said inside of said container for said thixotropic coating to cover, said normal surface being less then one thickness of said metal.

4. A method for coating a portion of the inside surface of a cylindrical container wherein said portion includes surface roughness and discontinuities representing raw material which must be protected against corrosion and must be prevented from contaminating comestibles packed and processed within said container including the following steps:

providing a thixotropically modified coating with 5 to 20% by weight of resin solids of a dispersed thixotropic agent;

applying said coating under shear forces substantially to maintain same as a liquid to the raw material, to generate a thin uniform layer;

allowing said material to rest and thereby transform to a gel for adhering over said surface roughness and discontinuities being the raw material which must be protected; and maintaining the gel during curing at elevated temperatures used to drive off volatile solvents.

5. The method of claim 4 wherein said thixotropic agent includes particulate silica added to the coating materials as a uniform dispersion.

6. The method of claim 5 wherein said silica has a surface to weight ratio of about 200 meter 2/gram.

7. The method of claim 4 wherein said modified coating includes silica and dispersed particulates in solvent and where the solvent causes said particulates to swell in size.

* * * * *